Oct. 5, 1965  W. L. MAPPES  3,210,533
VEHICLE LAMP UNIT
Filed Feb. 5, 1962  2 Sheets-Sheet 1
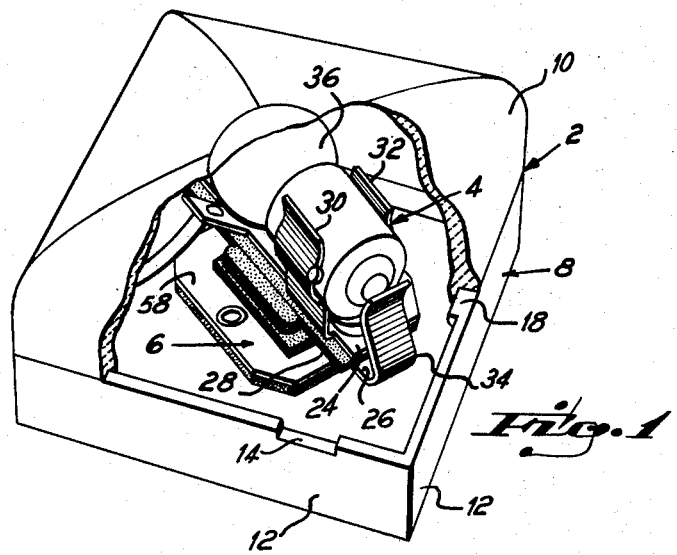
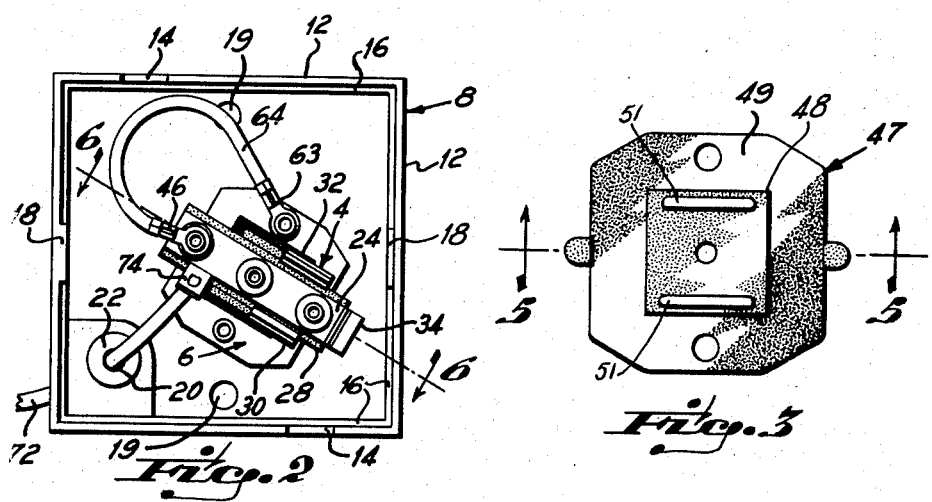
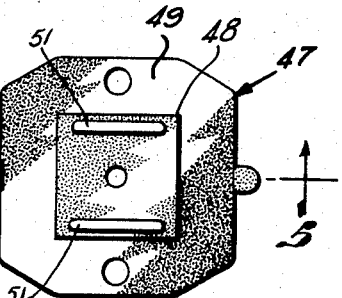
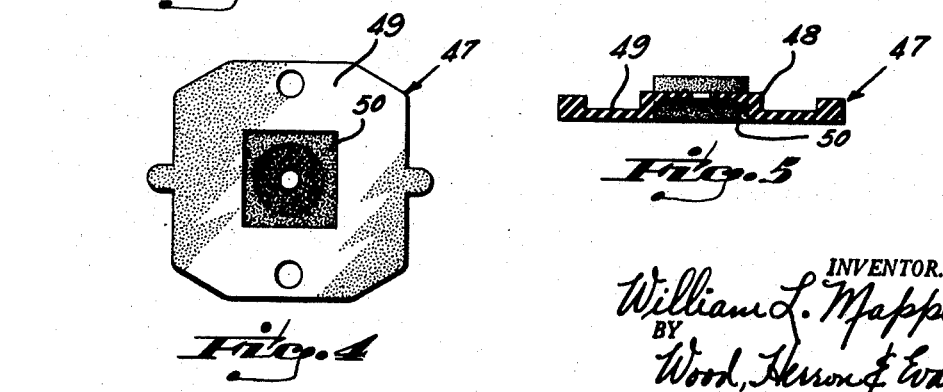
INVENTOR.
William L. Mappes.
BY
Wood, Herron & Evans.
ATTORNEYS.

Oct. 5, 1965  W. L. MAPPES  3,210,533
VEHICLE LAMP UNIT
Filed Feb. 5, 1962  2 Sheets-Sheet 2

INVENTOR.
William L. Mappes.
BY
Wood, Herron & Evans,
ATTORNEYS.

United States Patent Office 3,210,533
Patented Oct. 5, 1965

3,210,533
VEHICLE LAMP UNIT
William L. Mappes, Cincinnati, Ohio, assignor to Duplan Corporation, Winston-Salem, N.C., a corporation of Delaware
Filed Feb. 5, 1962, Ser. No. 170,878
4 Claims. (Cl. 240—8.2)

This invention relates to vehicle lights and in particular to clearance marker lights or identification lights which include resilient shock absorbing means for protecting the bulb of the vehicle light assembly.

Trucks and trailers are required by law to carry a number of clearance marker lights and identification lights as well as the usual tail light. The bulbs in these lights have been found to have an objectionably short life due at least in part to the fact that the bulbs are subjected to severe vibrations during normal operation of the truck and trailer. Replacement of bulbs consumes an appreciable amount of time. The cost of replacement of the bulbs, and the resulting increase in maintenance costs which result from these failures, has made it highly desirable to reduce bulb failures as much as possible.

The principal objective of this invention is to provide a resilient shock mounting between the bulb and the base of the lamp structure which is effective to absorb all types of vibrating movements of the base structure with a resulting lengthening of the life of the bulb. Otherwise expressed, this invention provides a cushion between the bulb and the base of the lamp assembly which will absorb all types of loads, shocks, vibrations and movements to which a lamp in normal usage upon a truck or trailer is subjected so as to maximize the life of the light bulb.

One difficulty which is encountered in providing a satisfactory mount is the fact that a mount which will absorb small vibratory loads or movements in a satisfactory manner will not generally be capable of absorbing heavy shock loads, concussions or sudden violent movements. By way of analogy, a light bulb mounted on one end of a very light spring or resilient member would have very little movement imparted to it through the spring or resilient member if a portion of the light spring or resilient member remote from the bulb were subjected to a small vibratory movement. However, if a portion of this same mounting remote from the bulb were subject to a large, heavy shock load or movement, the mounting, rather than absorbing the shock load or movement, would actually multiply this shock as a result of the sudden whipping action of the resilient mount transferred to the bulb.

A typical vehicle light of the type with which this invention is concerned consists of a housing or base member which is secured to the vehicle wall. The housing carries a lens which is secured to the housing in any suitable way. A socket and light bulb are mounted from the base of the housing, inside of the lens. According to the present invention, an elastomeric shock absorber is interposed between the base of the housing and the lamp bulb socket.

The present invention is predicated upon the empirical discovery and determination that an elastomeric member of a specific configuration provides unexpectedly good results in absorbing vibrations of the housing so that a bulb exhibits an extended life far beyond that of bulbs used in prior lamp units.

More particularly, a preferred form of resilient shock absorber of the present invention comprises a pad of rubber or other elastomeric material of generally rectangular outline configuration. The absorber includes a raised rectangular center portion which is surrounded by an outwardly extending marginal flange. The flange is clamped to the base member to form a rectangular air pocket between the base and the raised portion of the shock absorber. A lamp mounting bracket is secured to the flat raised portion of the resilient shock absorber by means of a rivet which passes through the mounting arms and engages the raised center portion of the rubber member. The lamp mounting arm assembly is thus free to oscillate to a limited degree about the rivet and is free to a much lesser degree to be shifted directly toward and away from the base by compressing or stretching the raised center portion. Thus, the present mount provides both a cushion of elastomeric material and an air cushion beneath the bulb mounting arm. It is to be understood that the pocket beneath the rubber mount is not absolutely airtight so that a slight damping effect is created by an escape of air from the pocket.

The present shock mount also includes two longitudinal ribs extending along opposite edges of the raised portion for engagement with portions of the lamp mounting arm assembly. These longitudinal ribs perform a double function. In the first place, they limit sideways pivotal movement of the lamp mounting arm and at the same time the arms reinforce the raised wall of the rubber section and modify its resilient characteristics to further improve the shock absorbing quality of the mount.

In addition to these ribs the peripheral flange of the rubber mount is provided with two upstanding projections which serve as resilient bumpers to limit oscillating movement of the lamp about the rivet and thereby prevent any contact of the lamp mounting bracket with the metal base.

An important advantage which accrues from this construction of the rubber mount and the lamp assembly is that the lamp unit is mounted directly over the air pocket or cushion so that the air cushion and the resilient mount serve as a diaphragm type of shock absorber with the shock being absorbed by both the enclosed air cushion and the resilient mount.

Another important advantage of this construction is that the lamp unit is free to oscillate to a limited extent on the resilient mounting so as to lessen the effect of shock loads or sudden movement of the base of the housing on the light unit. However, this oscillating movement is limited by engagement of the lamp unit with the resilient protrusions on the resilient shock mount so that regardless of how great a shock load or sudden movement is imparted to the base of the lamp housing, the lamp unit including the bulb and the mounting bracket for the bulb cannot come into contact with any other metal surface of the housing assembly.

Another advantage of this construction is that the resilient shock absorber is a compact, small, inexpensive mount which has sufficient rigidity to it to prevent whipping of the lamp unit mounted thereon when sudden movement is imparted to the base of the lamp assembly, but which still retains sufficient resiliency to absorb smaller vibratory or resonant type of shocks or movement of the lamp housing.

These and other objects and advantages of the invention will be more readily apparent and can best be further described with reference to the drawings in which:

FIGURE 1 is a perspective view of the lamp assembly with a portion of the cover partially broken away to show the lamp unit mounted thereon.

FIGURE 2 is a top plan view of the lamp assembly with the cover and the light bulb removed.

FIGURE 3 is a top plan view of the resilient shock mounting.

FIGURE 4 is a bottom view of the resilient shock mounting.

FIGURE 5 is a cross sectional view of the shock mounting taken along the lines 5—5 of FIGURE 3.

Figure 6:
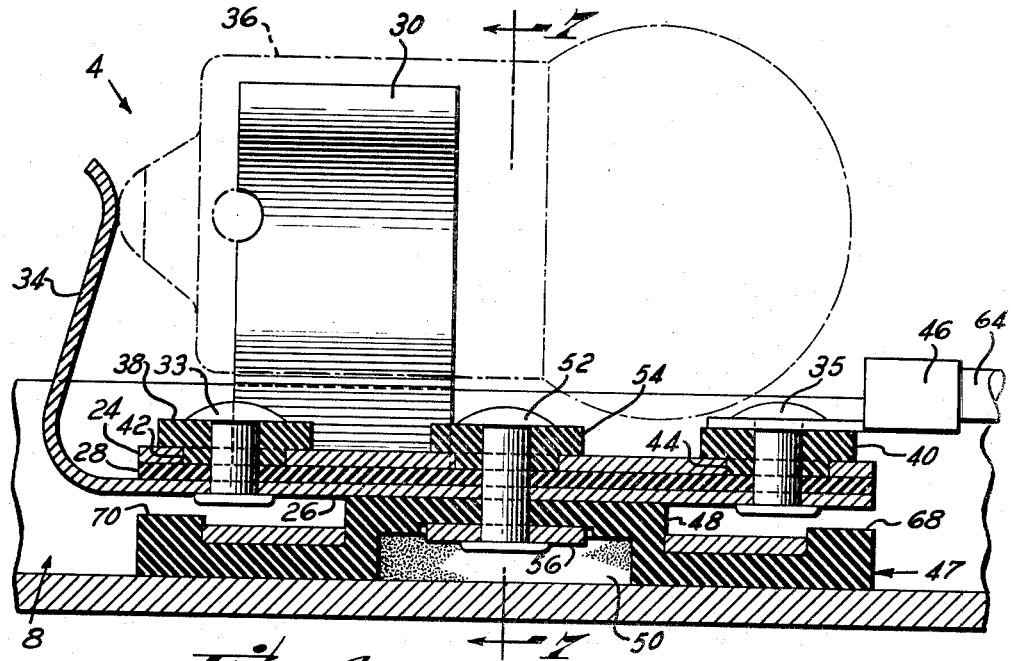
FIGURE 6 is a cross sectional view of the lamp assembly taken along the lines 6—6 of FIGURE 2.
Figure 7:
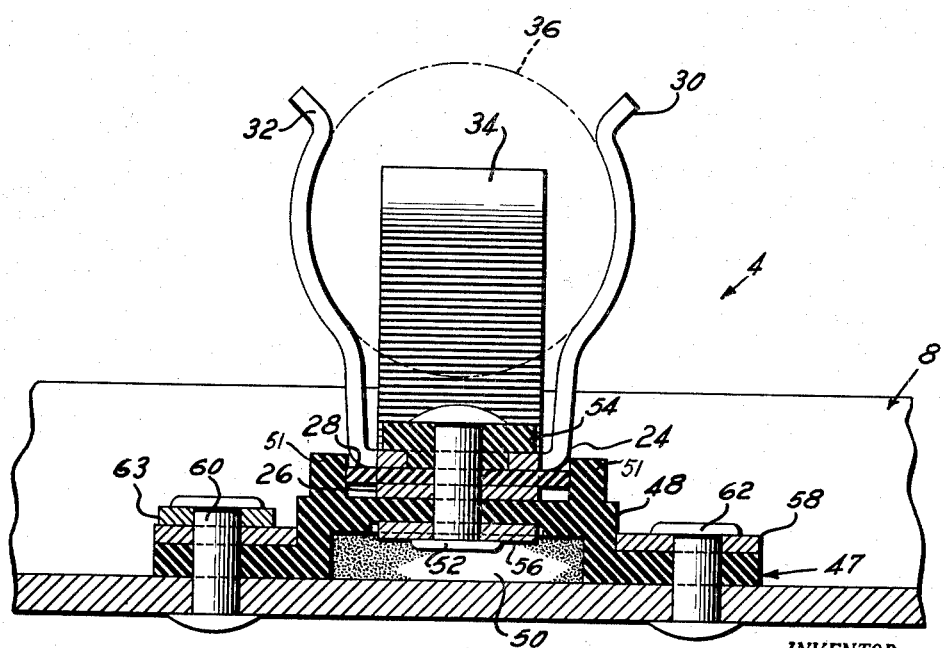
FIGURE 7 is a cross sectional view of the lamp assembly taken along the lines 7—7 of FIGURE 6.

The lamp assembly comprises three basic components; the lamp housing 2, the light unit 4 including the light bulb and the light bulb cradle and mounting bracket, and the resilient light unit mounting means 6. The resilient light unit mounting means serves as a shock absorber between the light unit and the housing.

The lamp housing is constituted by a die cast base 8 and a plastic lens cover 10. The base 8 is of an open rectangular box shape, the side walls 12 of which have two rectangular recesses at the top edge thereof. The side walls 12 also have a shoulder 16 extending around the inner surface thereof. Lens cover 10 is provided with slightly resilient walls that fit within the side walls 12 of the base in abutment with the shoulders 16. At the top edge of the side walls are two protrusions 18 which extend inwardly at opposite sides of the base and fit into two recesses (not shown) of the lens cover and serve to hold the lens cover thereon. Due to the inherent resiliency of the plastic material of which the lens cover is made, the cover is easily snapped into position on the base and is securely held thereon by the protrusions 18 and the recesses in the cover. The base 8 is provided with two bolt openings 19 and a lead in wire aperture 20. Aperture 20 is fitted with a rubber grommet 22 which provides a seal and protects the wire lead from excessive wear against the metal of the mounting base.

The light unit 4 includes a sheet metal light bulb cradle member 24 and a sheet metal contact member 26. The sheet metal cradle member 24 and the contact member 26 each includes flat base portions which extend in parallel planes but are separated and electrically insulated from each other by a sheet of plastic insulating material 28. Extending upwardly from two opposite sides of the cradle member 24 are two arcuately bent light bulb support arms 30, 32, which hold the light bulb with its axis parallel to the plane of the base of the sheet metal cradle member. At one end the sheet metal contact arm 26 has an upstanding resilient S-shaped portion 34 which engages the rear terminal of a light bulb 36 received within the arcuate portions 30, 32 of the cradle member.

The contact member 26 and the cradle member 28 are held together in spaced relation with the sheet of insulating material sandwiched therebetween by means of two rivets 33 and 35 which are made of an electrical conductive material such as aluminum. The rivets 33 and 35 are electrically insulated from the sheet metal cradle member 24 by means of plastic insulating washers 38 and 40, each of which has a depending portion which extends into apertures 42, 44 of the cradle member and separates the rivet from the cradle member. A terminal 46 of a ground wire is clamped between the head of the rivet 35 and the top of the insulating washer 40. This wire is also joined to a rivet interconnected to base member 12.

Light unit 4 is mounted upon resilient mounting means 6 which is in turn connected to the base 8 of the lamp housing. The resilient shock absorber or mounting means comprises a generally rectangular sheet of rubber or elastomeric material 47 which has an upwardly extending central raised portion 48 and an outwardly extending marginal flange. The central raised portion forms a pocket or closed recess 50 on the lower side of the elastomeric mount between the resilient mount and the lamp base 8. The raised portion 48 is of rectangular cross section and has a flat upper surface upon which the light unit 4 is mounted. The light unit is connected to the raised portion 48 of the elastomeric mount by means of a rivet 52 which extends through aligned apertures in an insulating washer 54, the sheet of insulating material 28, the base of the contact member 26, the raised portion of the sheet of elastomeric material and a washer 56.

The sheet of elastomeric material is clamped to the base 8 of the housing by means of flat sheet metal plate which surrounds the raised portion of the resilient mount and sandwiches the marginal flange 49 of the material between the sheet metal plate 58 and the base of the housing 8. Two rivets 60 and 62 extend through the sheet metal member 58, the elastomeric mounting material and the base of the housing 8. A terminal 63 of the ground wire 64 is clamped between the head of the rivet 60 and the of sheet metal clamping member 58.

Two reinforcing ribs 51 extend along the top of the raised portion 48 of the elastomeric mount at opposite edges thereof parallel to the axis of the light bulb. These reinforcing ribs serve to rigidify the raised portion of the elastomeric mount and to prevent the light unit from pivoting in a transverse plane about the rivet 52. These reinforcing ribs also modify the characteristics of the mounting member 47. It has been empirically determined that the modification provided by these ribs in fact nearly doubles the life of a light bulb mounted in the light unit.

Two elastomeric protrusions 68, 70 extend upwardly and outwardly from marginal flange 49 on opposite sides of the elastomeric mount at points directly beneath the light unit. These protrusions serve to snub whipping action of the light unit as it is oscillated about the rivet 52 when the light unit is subjected to shock or vibratory movement.

The electrical circuit for the light bulb is through a lead 72 which is connected to a power source and to the terminal 74 of the sheet metal cradle member 24. The electrical current then passes through the sheet metal cradle 24, the sides of the bulb member which act as a terminal for the bulb, the filament of the bulb, contact member 26, rivet 35, ground wire 64, and rivet 60 to the base of the lamp housing which is connected to a grounded surface.

It will be understood that the above detailed description is made by way of illustration and not limitation, it being contemplated that those skilled in the art will readily envision many modifications in the details of the invention which may be made without departing from the scope of the appended claims.

I claim:

1. A lamp assembly comprising a lamp housing having a base and a lens mounted thereon, an elastomeric shock absorber mounted on said base and having a marginal flange and raised portion thereon which forms an air pocket between said housing and said shock absorber, said raised portion comprising upstanding side walls, a transverse upper wall and two parallel raised reinforcing ribs on the top surface thereof, a lamp mounting unit, means securing said lamp mounting unit on top of said transverse wall between said reinforcing ribs, said ribs engaging said unit so that said light mounting unit is free for limited oscillating movement on said shock absorber but are restricted from pivoting in a transverse plane.

2. A lamp assembly comprising a lamp housing having a base and a lens mounted thereon, an elastomeric shock absorber mounted on said base and having a marginal flange and raised portion thereon which forms an air pocket between said housing and said shock absorber, said raised portion comprising upstanding side walls, a transverse upper wall and two parallel raised reinforcing ribs on the top surface thereof, a lamp mounting cradle having a transversely extending base and a pair of upwardly extending lamp supporting arms, means securing said lamp mounting cradle base to the top of said transverse wall between said reinforcing ribs, said ribs engaging said cradle so that said lamp mounting cradle is free for limited oscillating movement on said shock absorber but is restricted from pivoting in a transverse plane, and two upstanding projections carried by said marginal flange and disposed for engagement with said lamp cradle base during oscillation of said cradle to limit oscillating movement of said cradle base.

3. A lamp assembly comprising a lamp housing having a base and a lens mounted thereon, an elastomeric shock absorber located on said base and having a raised portion thereon, said shock absorber being fixedly mounted on said base by means of a mounting ring extending over the lower portion of said shock absorber with the inner edge closely adjacent said raised portion, said raised portion having two parallel reinforcing ribs on the top surface thereof, and a light unit mounted on said raised portion between said reinforcing ribs whereby said light unit is free for limited movement on said shock absorber.

4. A lamp assembly comprising a lamp housing having a base and a lens mounted thereon, an elastomeric shock absorber located on said base and having a raised portion thereon, said shock absorber being fixedly mounted on said base by means of a mounting ring extending over the lower portion of said shock absorber with the inner edge closely adjacent said raised portion, said shock absorber having two parallel reinforcing ribs on the top surface of said raised portion and protrusions on the lower portion extending upwardly above said locating ring, and a light unit mounted on said raised portion between said reinforcing ribs whereby said light unit is free for limited movement on said shock absorber.

References Cited by the Examiner

UNITED STATES PATENTS

| | | | |
|---|---|---|---|
| 2,037,032 | 4/36 | Lord | 248—358 |
| 2,099,444 | 11/37 | Langdon | 240—90 X |
| 2,131,828 | 10/38 | Williamson | 240—90 |
| 2,754,410 | 7/56 | Thielorn | 240—8.2 X |
| 2,830,171 | 4/58 | Buck | 240—90 X |
| 2,985,750 | 5/61 | Ritz-Woller et al. | 240—7.1 |
| 3,118,616 | 1/64 | Magazanik | 240—90 X |
| 3,145,933 | 8/64 | Dickson | 240—8.2 |

NORTON ANSHER, *Primary Examiner.*